US012265749B2

(12) United States Patent
Qian (10) Patent No.: US 12,265,749 B2
(45) Date of Patent: Apr. 1, 2025

(54) VIDEO WALL SYSTEM

(71) Applicant: Silicon Motion, Inc., Jhubei (TW)

(72) Inventor: Xiaobing Qian, Jhubei (TW)

(73) Assignee: SILICON MOTION, INC., Jhubei (TW)

( * ) Notice: Subject to any disclaimer, the term of this patent is extended or adjusted under 35 U.S.C. 154(b) by 0 days.

(21) Appl. No.: 18/487,324

(22) Filed: Oct. 16, 2023

(65) Prior Publication Data

US 2024/0160398 A1 May 16, 2024

(30) Foreign Application Priority Data

Nov. 11, 2022 (CN) .......................... 202211411265.1

(51) Int. Cl.
*G06F 3/14* (2006.01)
*G06F 3/147* (2006.01)

(52) U.S. Cl.
CPC .......... *G06F 3/1446* (2013.01); *G06F 3/1438* (2013.01); *G06F 3/147* (2013.01)

(58) Field of Classification Search
CPC ...... G06F 3/04166; G01R 27/16; G11C 16/26
See application file for complete search history.

(56) References Cited

U.S. PATENT DOCUMENTS

| 11,169,760 | B1* | 11/2021 | Qi | G06F 3/1438 |
| 2003/0151562 | A1* | 8/2003 | Kulas | G06F 3/1446 |
| | | | | 345/1.1 |
| 2014/0111530 | A1* | 4/2014 | Choi | G06F 12/00 |
| | | | | 345/545 |
| 2016/0127710 | A1 | 5/2016 | Saban | |
| 2018/0018931 | A1* | 1/2018 | Zhang | G09G 5/397 |
| 2018/0293959 | A1* | 10/2018 | Monga | G06F 3/1446 |
| 2020/0143772 | A1 | 5/2020 | Huang | |
| 2020/0326899 | A1* | 10/2020 | Seo | G09G 3/32 |

FOREIGN PATENT DOCUMENTS

| TW | 2017/17653 A | 5/2017 |
| TW | 2020/19149 A | 5/2020 |

* cited by examiner

*Primary Examiner* — Premal R Patel
(74) *Attorney, Agent, or Firm* — McClure, Qualey & Rodack, LLP (57) ABSTRACT

A video wall system with software running on a host computer and a video wall control device is shown. Using the software, the user inputs the size of each screen of a video wall and, accordingly, the delay time for each row of screens of the video wall is calculated. The video wall control device couples the host computer to the screens. The video wall control device outputs a plurality of split videos to the different screens through separated output ports, and drives each row of screens to display according to the delay time calculated for the row of screens.

20 Claims, 6 Drawing Sheets

VIDEO WALL SYSTEM

CROSS REFERENCE TO RELATED APPLICATIONS

This Application claims priority of China Patent Application No. 202211411265.1, filed on Nov. 11, 2022, the entirety of which is incorporated by reference herein.

BACKGROUND OF THE INVENTION

Field of the Invention

The present invention relates to a video wall system.

Description of the Related Art

A video wall is composed of multiple screens. How to operate the screens to splice a big video without image tearing is an important issue in this technical field.

BRIEF SUMMARY OF THE INVENTION

The present invention proposes a video wall system, which operates a plurality of screens to splice a big video without image tearing.

A video wall system in accordance with an exemplary embodiment of the present invention includes software running on a host computer, and a video wall control device. Using the software, the user inputs the size of each screen of a video wall and, accordingly, the delay time for each row of screens of the video wall is calculated. The host computer is coupled to the screens through the video wall control device. The video wall control device outputs a plurality of split videos to the different screens through separated output ports, and drives each row of screens to display according to the delay time calculated for the row of screens.

Based on the first vertical screen resolution of the first row of screens, the software running on the host computer may calculate the delay time of the second row of screens. The second row of screens is adjacent to the bottom of the first row of screens. The video wall control device makes the second vertical synchronization signal of the second row of screens lag behind the first vertical synchronization signal of the first row of screens according to the delay time the software calculates for the second row of screens.

When calculating the delay time for the second row of screens, the software running on the host computer may further consider the vertical video resolution and the refresh rate of the split videos corresponding to the first row of screens.

The software running on the host computer may calculate the delay time for the second row of screens based on a calculation:

$$t\_delay = (h1/h\_data1) \cdot (1/f),$$

where, t_delay is the delay time for the second row of screens, h1 is the first vertical screen resolution of the first row of screens, h_data1 is the vertical video resolution of the split videos corresponding to the first row of screens, and f is the refresh rate of the split videos corresponding to the first row of screens.

In an exemplary embodiment, the screens are the same in size. The software running on the host computer calculates the delay time for the second row of screens (adjacent to the bottom of the first row of screens) based on a refresh rate of each split video. The video wall control device makes the second vertical synchronization signal of the second row of screens lag behind the first vertical synchronization signal of the first row of screens according to the delay time that the software calculates for the second row of screens.

The software running on the host computer calculates the delay time for the second row of screens based on a calculation:

$$t\_delay = 1/f,$$

where, t_delay is the delay time for the second row of screens; and f is the refresh rate.

In an exemplary embodiment, the video wall control device uses a universal serial bus input port to connect to the host computer to receive compressed data of the split videos as well as the delay time for each row of screens. The output ports of the video wall control device are implemented by a high-definition multimedia interface.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
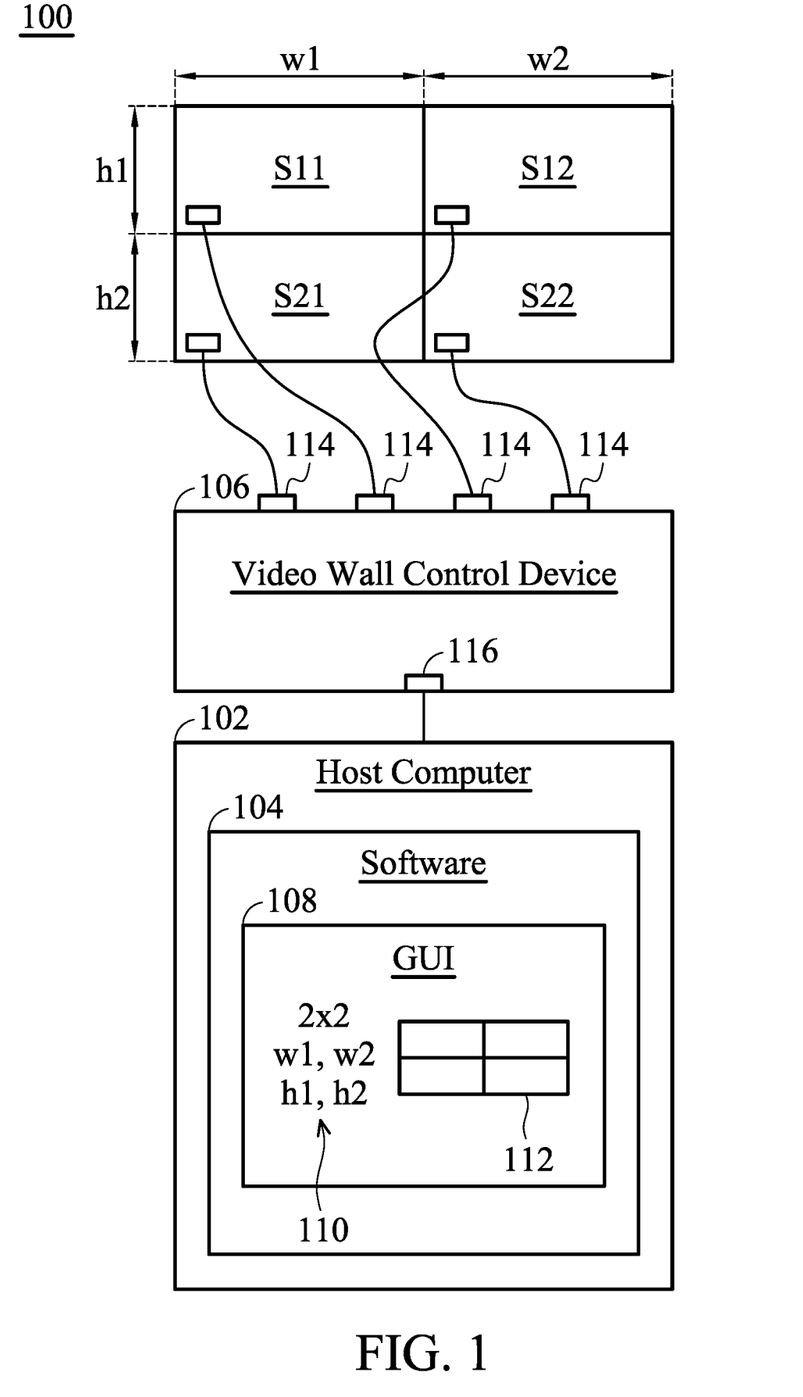
FIG. 1 illustrates a video wall system 100 in accordance with an exemplary embodiment of the present invention.

FIG. 1 illustrates a video wall system 100 in accordance with an exemplary embodiment of the present invention, including a plurality of screens (S11, S12, S21, and S22) which form a video wall, a host computer 102 (on which software 104 runs), and a video wall control device 106. The host computer 102 is coupled to the screens (S11, S12, S21, and S22) through the video wall control device 106.

The software 104 running on the host 102 may provide a graphical user interface (GUI) 108 for the user to input the size of these screens (S11, S12, S21, and S22). As shown, the GUI icon 110 is for the user to fill in the size of the screen array (2×2), the first horizontal screen resolution w1, the second horizontal screen resolution w2, the first vertical screen resolution h1, and the second vertical screen resolution h2. An image 112 simulates this 2×2 screen array. Based on the size information (w1, w2, h1, and h2) of the screen array, the delay time for each row of screens is calculated by the software 104. The video wall control device 106 outputs a plurality of split videos to these screens (S11, S12, S21, and S22) through the separated output ports (all marked by 114), and drives each row of screens to display their corresponding split videos according to the calculated delay time. Thus, the displayed split videos form a big screen video without the tearing problem.

For example, compared to the display on the screens S11 and S12 in the first row, the display on the screens S21 and S22 in the second row is delayed by the calculated delay time.

In particular, the data of the split videos is generated at the host computer 102 side (with frame numbers corresponding to the different big images), and then sent to the video wall control device 106 to be provided to the screens (S11, S12, S21, and S22) in parallel through the output ports 114. If these screens (S11, S12, S21, and S22) are strictly synchronized, a torn video will be shown on the video wall. For example, if the first row of screens (S11 and S12) and the second row of screens (S21 and S22) use exactly the same vertical synchronization signal (Vsync), visually, the second row of screens (S21 and S22) is refreshed earlier than the first row of screens (S11 and S12). This tearing problem is obvious when the video wall displays a moving vertical line that is shifted from the left to the right of the video wall. The proposed delay design considerably improves the video tearing problem.

In an exemplary embodiment, the first vertical screen resolution h1 of the first row of screens (S11 and S12) is different from the vertical video resolution h_data1 of the split videos received by the first row of screens (S11 and S12).

In an exemplary embodiment, based on the first vertical screen resolution h1 of the first row of screens (S11 and S12), the software 104 running on the host computer 102 calculates the delay time t_delay for the second row of screens (S21 and S12). The second row of screens is adjacent to the bottom of the first row of screens (S11 and S12). The video wall control device 106 makes the second vertical synchronization signal (Vsync2) of the second row of screens (S21 and S22) lag behind the first vertical synchronization signal (Vsync1) of the first row of screens (S11 and S12) by the delay time t_delay.

In an exemplary embodiment, as delayed by the delay time t_delay, the second vertical synchronous signal (Vsync2) is asserted after the last row of pixels of the first row of screens (S11 and S12) has been scanned to display. After being triggered by the delayed second vertical synchronous signal (Vsync2), the second row of screens (S21 and S22) starts its progressive scanning (row by row) to display.

In an exemplary embodiment, when the software 104 running on the host computer 102 calculates the delay (t_delay) of the second row of screens (S21 and S22), it further considers the vertical video resolution h_data1 and the refresh rate f of the split videos received by the first row of screens (S11 and S12). The software 104 may calculate:

$$t\_delay=(h1/h\_data1)\cdot(1/f).$$

In an exemplary embodiment, the split videos the video wall control device 106 transfers to the screens (S11, S12, S21, and S22) in parallel through the output ports 114 each is in a resolution of 1920×1080 and with a refresh rate of 60 Hz; that is, h_data1=1080, and f=60Hz. If the first vertical screen resolution h1 of the first row of screens (S11 and S12) is 480, the delay time (t_delay) for the second row of screens (S21 and S22) can be set to (480/1080)·(1/60) seconds. Screen tearing problem will be perfectly eliminated.

In an exemplary embodiment, the screens (S11, S12, S21, and S22) do not necessarily in the uniform size. For example, the first vertical screen resolution h1 of the first row of screens (S11 and S12) may be different from the second vertical first resolution h2 of the second row of screens (S21 and S22). The screens with non-fixed size may be light-emitting diode (LED) screens. According to the proposed technique, an LED video wall of any size can display a big video smoothly. The LED screens can also be replaced by liquid-crystal display (LCD) screens.

In another exemplary embodiment, all the screens (S11, S12, S21, and S22) of the video wall are the same in size. It means: h1=h2; and w1=w2. According to the refresh rate f of each split video, the software 104 running on the host computer 102 calculates the delay time t_delay for the second row of screens (S21 , S22). The video wall control device 106 makes the second vertical synchronization signal (Vsync2) of the second row of screens (S21 and S22) lag the first vertical sync signal (Vsync1) of the first row of screens (S11 and S12) by the delay time t_delay.

In an exemplary embodiment, the software 104 running on the host computer 102 calculates: t_delay=1/f. Thus, the delay time (t_delay) about the vertical synchronization delay for the second row of screens (S21 and S22) is determined.

In an exemplary embodiment, the split videos the video wall control device 106 outputs to these screens (S11, S12, S21, and S22) in parallel through the separated output ports 114 have the same refresh rate, 60 Hz. That is, f=60 Hz. The delay time (t_delay) for the second row of screens (S21 and S22) can be set to 1/60 sec. The screen tearing problem can be perfectly eliminated.

The screens (S11, S12, S21, and S22) have the same size may be implemented by liquid-crystal display (LCD) screens with the same size, or light-emitting diode (LED) screens with the same size.

In an exemplary embodiment, the video wall control device 106 is coupled to the host computer 102 through a universal serial bus (USB) port 116 to receive the compressed data of these split videos with the information about delay time for each row of screens. The output ports 114 of the video wall control device 106 may be implemented by a High Definition Multimedia Interface (HDMI).

The hardware implementation of the video wall control device 106 is discussed below.

Figure 2:
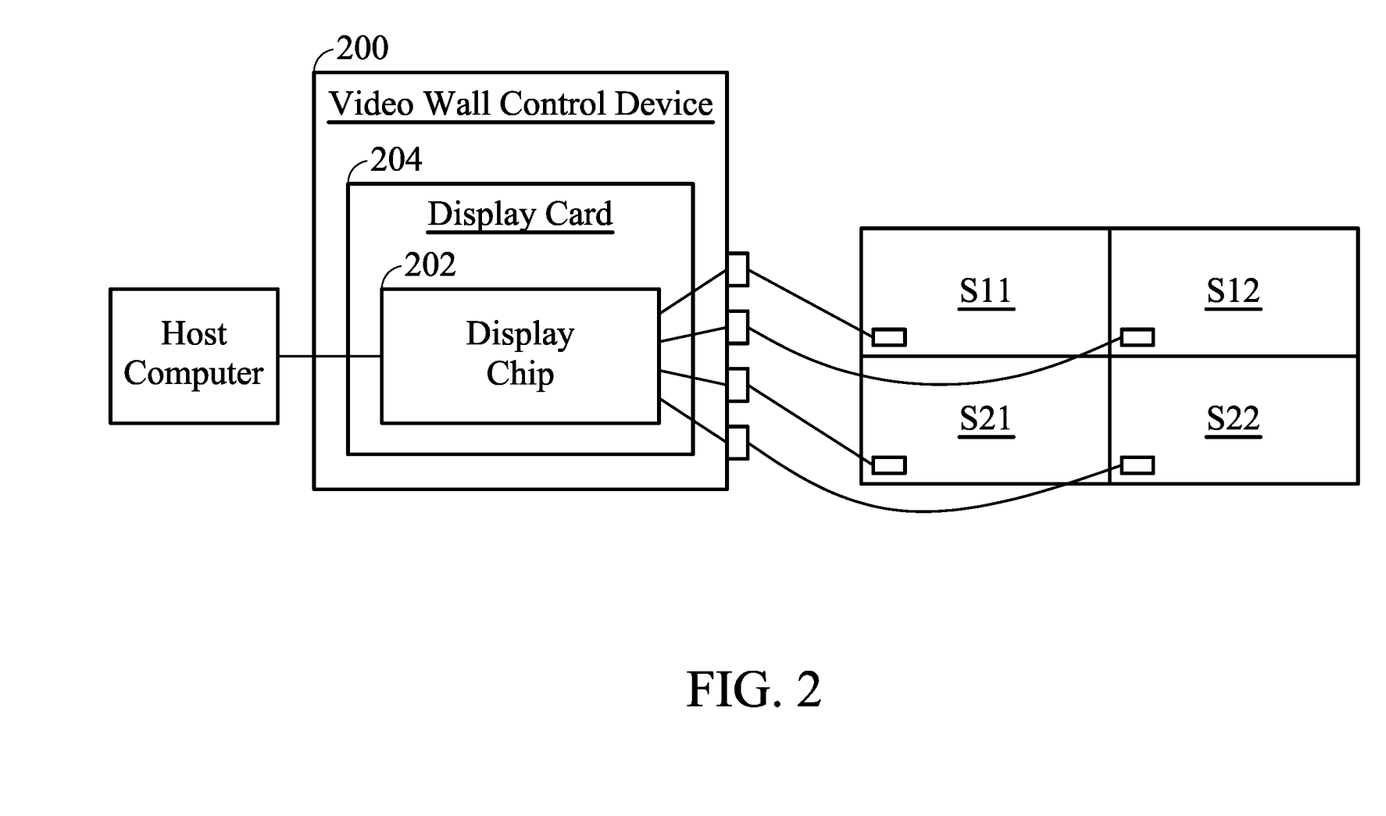
FIG. 2 illustrates a video wall control device 200 in accordance with an exemplary embodiment of the present invention.

FIG. 2 illustrates a video wall control device 200 in accordance with an exemplary embodiment of the present invention. The video wall control device 200 is realized by a single display card 204 with a single display chip 202 installed thereon. The single display chip 202 provides four HDMI split videos to drive the four screens (S11, S12, S21, and S22) to display a big video, wherein the aforementioned delay design is adopted.

Figure 3:
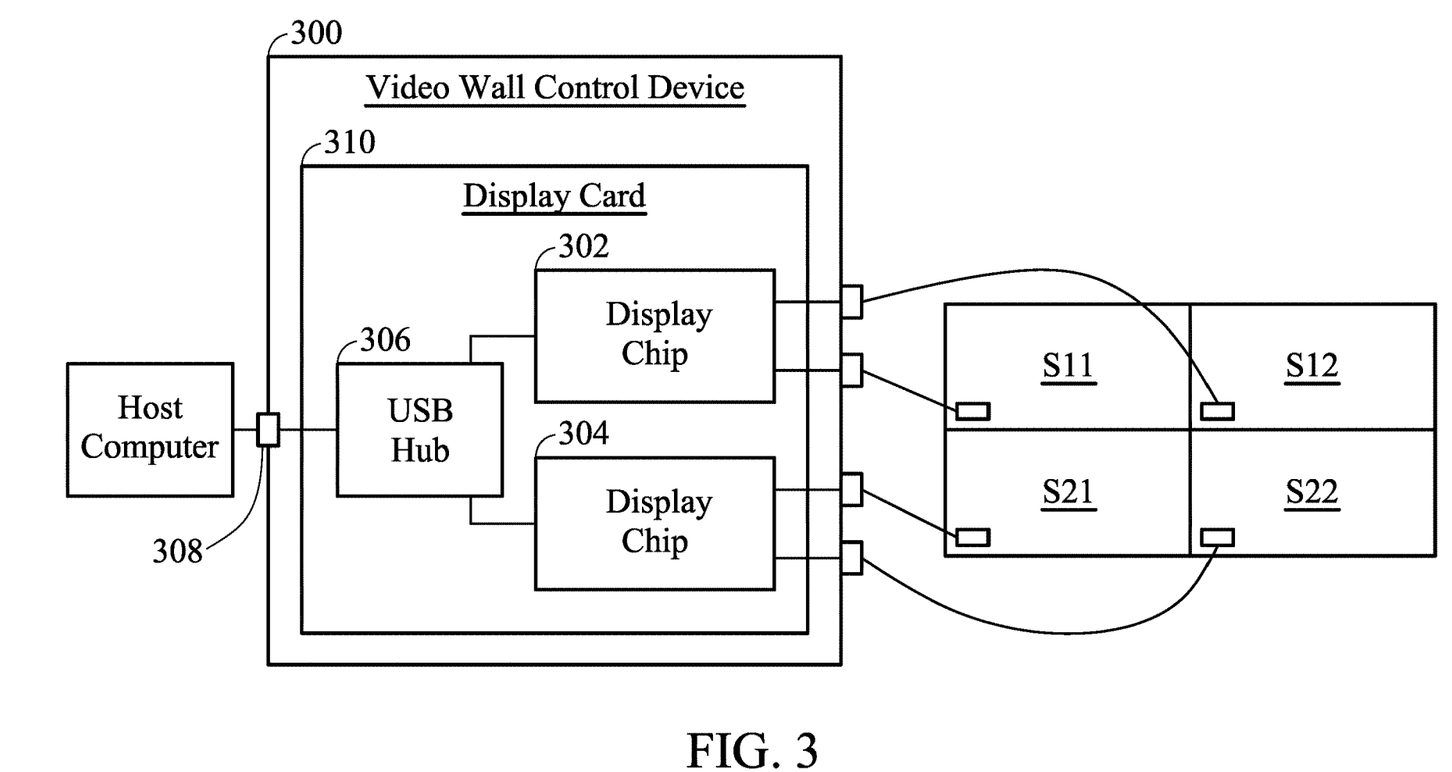
FIG. 3 illustrates a video wall control device 300 in accordance with another exemplary embodiment of the present invention.
Figure 4:
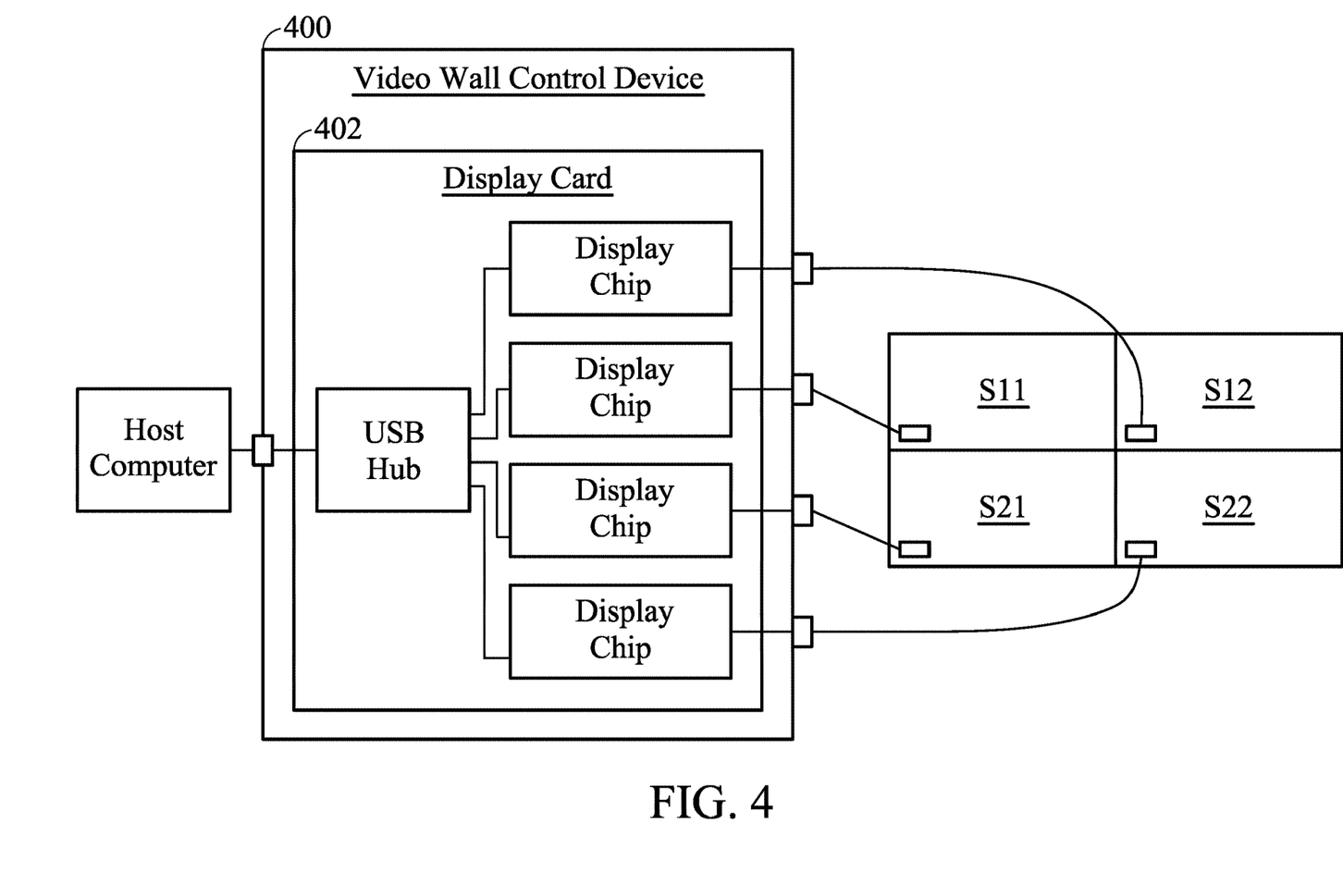
FIG. 4 illustrates a video wall control device 400 in accordance with another exemplary embodiment of the present invention.

FIG. 3 illustrates a video wall control device 300 in accordance with an exemplary embodiment of the present invention. The video wall control device 300 is realized by a plurality of display chips 302 and 304. Each display chip provides two HDMI split videos to drive two screens to display. The different rows of screens are driven according to the aforementioned delay design. The video wall control device 300 further has a USB hub 306 that couples the USB input port 308 to the display chips 302 and 304. The video wall control device 300 uses a single display card 310 to install the multiple display chips (302 and 304) and the USB hub 306. FIG. 4 illustrates another video wall control device 400 in accordance with an exemplary embodiment of the present invention. Compared with the video wall control device 300, each display chip of the video wall control device 400 provides a single HDMI split video to drive one screen to display. All display chips are installed on the same single display card 402.

Figure 5:
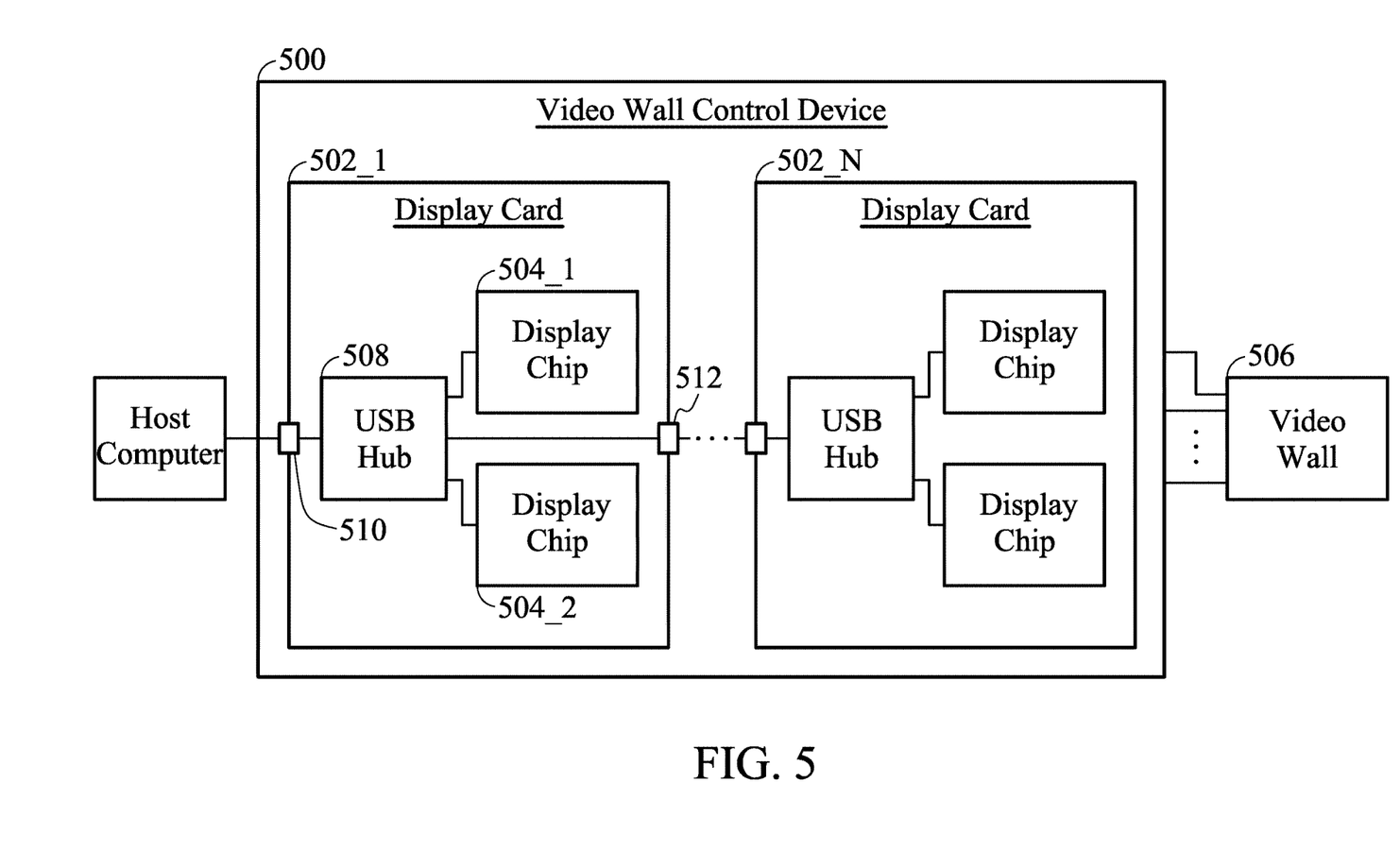
FIG. 5 illustrates a video wall control device 500 for driving a larger-sized video wall in accordance with an exemplary embodiment of the present invention.

FIG. 5 illustrates a video wall control device 500 for driving a larger-sized video wall in accordance with an exemplary embodiment of the present invention. The video wall control device 500 uses a plurality of display cards 502_1 . . . 502_N. Multiple display chips are disposed on each display card (e.g., the two display chips 504_1 and 504_2 on the display card 502_1). Each display card has a USB hub (e.g., 508). Through the USB hub 508, the USB input port 510 of the display card 502_1 is coupled to the display chips 504_1 . . . 504_2. Through the USB hub 508, the USB input port 510 is further coupled to the USB output port 512, and so is further coupled to the next display card (e.g., 502_2). The multiple display cards outputting split videos in parallel can also use the delay design of the present invention to ensure the smooth video playback.

Figure 6:
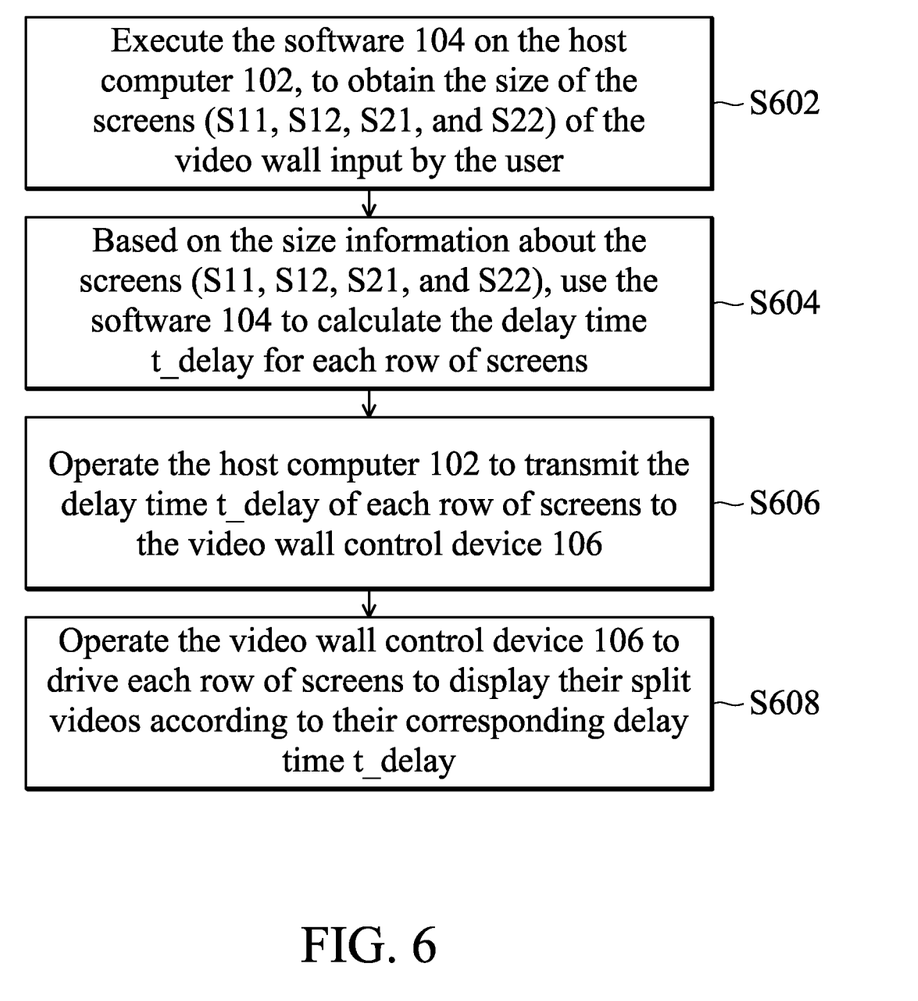
FIG. 6 is a flowchart depicting a video wall control method in accordance with an exemplary embodiment of the present invention.

FIG. 6 is a flowchart depicting a video wall control method in accordance with an exemplary embodiment of the present invention. In step S602, through the software 104 running on the host computer 102, the size of the screens (S11, S12, S21, and S22) of the video wall is input by the user. In step S604, based on the size information about the screens (S11, S12, S21, and S22), the software 104 running on the host computer 102 calculates the delay time t_delay for each row of screens. For example, the delay time t_delay is calculated for the second row of screens (S21, S22), to make the display on the second row of screens (S21, S22) lag behind the display on the first row of screens (S11, S12). In step S606, the host computer 102 transmits the delay time t_delay of each row of screens to the video wall control device 106. In step S608, the video wall control device 106 drives each row of screens to display their split videos according to their corresponding delay time t_delay.

Any video wall system using the video wall control device 106 and having the software 104 to be executed on the host computer 102 falls within the protection scope of the present invention.

The video wall is not limited to the aforementioned 2×2 screen array. The video wall with a screen array of the other size can also be driven by the above-mentioned delay design.

The number of HDMI outputs of each display chip is also not limited; it may be 1, 2, 4, or other numbers.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A video wall system, comprising:
    software running on a host computer, for a user to input size of each screen of a video wall, to calculate a delay time for each row of screens of the video wall; and
    a video wall control device, coupling the host computer to the screens,
    wherein:
    the video wall control device outputs a plurality of split videos to the different screens through separated output ports, and drives each row of screens to display according to the delay time calculated for the row of screens, wherein the screens of the same row correspond to the same delay time; and
    based on a first vertical screen resolution of a first row of screens, the software running on the host computer calculates a delay time of a second row of screens adjacent to the bottom of the first row of screens.

2. The video wall system as claimed in claim 1, wherein:
    the video wall control device makes a second vertical synchronization signal of the second row of screens lag behind a first vertical synchronization signal of the first row of screens according to the delay time the software calculates for the second row of screens.

3. The video wall system as claimed in claim 2, wherein:
    when calculating the delay time for the second row of screens, the software running on the host computer further considers a vertical video resolution and a refresh rate of split videos corresponding to the first row of screens.

4. The video wall system as claimed in claim 3, wherein the software running on the host computer calculates the delay time for the second row of screens based on a calculation:

$$t\_delay = (h1/h\_data1) \cdot (1/f),$$

where:
t_delay is the delay time for the second row of screens;
h1 is the first vertical screen resolution of the first row of screens;
h_data1 is the vertical video resolution of the split videos corresponding to the first row of screens; and
f is the refresh rate of the split videos corresponding to the first row of screens.

5. The video wall system as claimed in claim 3, wherein:
    the first vertical screen resolution of the first row of screens is different from a second vertical screen resolution of the second row of screens.

6. The video wall system as claimed in claim 3, wherein:
    the screens are light-emitting diode (LED) screens or liquid-crystal display (LCD) screens.

7. The video wall system as claimed in claim 1, wherein:
    the video wall control device uses a universal serial bus input port to connect to the host computer to receive compressed data of the split videos as well as the delay time for each row of screens.

8. The video wall system as claimed in claim 7, wherein:
    the output ports of the video wall control device are implemented by a high-definition multimedia interface.

9. The video wall system as claimed in claim 8, wherein:
    the video wall control device uses a single display chip to drive all screens to display their corresponding split videos.

10. The video wall system as claimed in claim 8, wherein:
    the video wall control device is implemented by a single display card; and
    multiple display chips are disposed on the single display card, and the single display card has a universal serial bus hub;
    the display chips drive the screens to display; and
    through the universal serial bus hub, the universal serial bus input port is coupled to the display chips.

11. The video wall system as claimed in claim 8, wherein:
    the video wall control device is implemented by a plurality of display cards;
    the display cards are connected in series through a universal serial bus interface;

each display card is installed with a plurality of display chips for driving multiple screens, and has a universal serial bus hub that couples a universal serial bus input port of the display card to the display chips on the display card; and on each display card, the universal serial bus hub further couples the universal serial bus input port of the display card to a universal serial bus output port of the display card.

12. A video wall system, comprising:

software running on a host computer, for a user to input size of each screen of a video wall, to calculate a delay time for each row of screens of the video wall; and a video wall control device, coupling the host computer to the screens, wherein:

the video wall control device outputs a plurality of split videos to the different screens through separated output ports, and drives each row of screens to display according to the delay time calculated for the row of screens, wherein the screens of the same row correspond to the same delay time;

the screens are the same in size; and the software running on the host computer calculates a delay time for a second row of screens based on a refresh rate of each split video, wherein, the second row of screens is adjacent to the bottom of the first row of screens.

13. The video wall system as claimed in claim 12, wherein:

the video wall control device makes a second vertical synchronization signal of the second row of screens lag behind a first vertical synchronization signal of the first row of screens according to the delay time the software calculates for the second row of screens.

14. The video wall system as claimed in claim 13, wherein the software running on the host computer calculates the delay time for the second row of screens based on a calculation:

$$t\_delay = 1/f,$$

where:

t_delay is the delay time for the second row of screens; and f is the refresh rate.

15. The video wall system as claimed in claim 14, wherein:

the screens are liquid-crystal display (LCD) screens or light-emitting diode (LED) screens.

16. The video wall system as claimed in claim 12, wherein:

the video wall control device uses a universal serial bus input port to connect to the host computer to receive compressed data of the split videos as well as the delay time for each row of screens.

17. The video wall system as claimed in claim 16, wherein:

the output ports of the video wall control device are implemented by a high-definition multimedia interface.

18. The video wall system as claimed in claim 17, wherein:

the video wall control device uses a single display chip to drive all screens to display their corresponding split videos.

19. The video wall system as claimed in claim 17, wherein:

the video wall control device is implemented by a single display card; and multiple display chips are disposed on the single display card, and the single display card has a universal serial bus hub;

the display chips drive the screens to display; and through the universal serial bus hub, the universal serial bus input port is coupled to the display chips.

20. The video wall system as claimed in claim 17, wherein:

the video wall control device is implemented by a plurality of display cards;

the display cards are connected in series through a universal serial bus interface;

each display card is installed with a plurality of display chips for driving multiple screens, and has a universal serial bus hub that couples a universal serial bus input port of the display card to the display chips on the display card; and on each display card, the universal serial bus hub further couples the universal serial bus input port of the display card to a universal serial bus output port of the display card.

* * * * *